US012469423B2

(12) United States Patent
Auger et al.

(10) Patent No.: US 12,469,423 B2
(45) Date of Patent: Nov. 11, 2025

(54) DYNAMIC IMAGE ENHANCEMENT FOR VEHICLE DISPLAY

(71) Applicant: VISTEON GLOBAL TECHNOLOGIES, INC., Van Buren Township, MI (US)

(72) Inventors: Elijah Louis Auger, Farmington Hills, MI (US); Paul Fredrick Luther Weindorf, Novi, MI (US); James A. Carpenter, Rochester Hills, MI (US)

(73) Assignee: Visteon Global Technolgoies, Inc., Van Buren Township, MI (US)

( * ) Notice: Subject to any disclaimer, the term of this patent is extended or adjusted under 35 U.S.C. 154(b) by 0 days.

(21) Appl. No.: 18/667,293

(22) Filed: May 17, 2024

(65) Prior Publication Data

US 2024/0386830 A1 Nov. 21, 2024

Related U.S. Application Data

(60) Provisional application No. 63/503,447, filed on May 19, 2023.

(51) Int. Cl.
*G09G 3/20* (2006.01)

(52) U.S. Cl.
CPC ... *G09G 3/2007* (2013.01); *G09G 2320/0233* (2013.01); *G09G 2320/0673* (2013.01); *G09G 2380/10* (2013.01)

(58) Field of Classification Search
CPC ... G09G 2320/0233; G09G 2320/0673; G09G 2380/10; G09G 3/2007
See application file for complete search history.

(56) References Cited

U.S. PATENT DOCUMENTS

| | | | | |
|---|---|---|---|---|
| 10,684,164 | B2 * | 6/2020 | Kang | G01J 1/4228 |
| 10,911,748 | B1 * | 2/2021 | Molholm | H04N 17/04 |
| 2011/0181541 | A1 * | 7/2011 | Kuo | H04M 1/22 348/78 |
| 2014/0333647 | A1 * | 11/2014 | Lee | G02B 27/0179 345/589 |
| 2024/0161715 | A1 * | 5/2024 | Lee | G09G 5/003 |

* cited by examiner

*Primary Examiner* — Kenneth Bukowski
(74) *Attorney, Agent, or Firm* — Quinn IP Law

(57) ABSTRACT

Dynamic enhancement of video images presented through an electronic display. The dynamic enhancement may be utilized with a display of a vehicle and include measuring an ambient light or other external influences influencing symbology of human visibility for the video images to be presented through the display, generating a plurality of enhanced setpoints operable for maintaining symbology of the video images against the ambient light, and directing the display to present the video images according to the enhanced setpoints such that the symbology of the video images is reasonably maintained against the external influences.

20 Claims, 8 Drawing Sheets

DYNAMIC IMAGE ENHANCEMENT FOR VEHICLE DISPLAY

CROSS-REFERENCE TO RELATED APPLICATIONS

This application claims the benefit of U.S. Provisional Application No. 63/503,447, filed May 19, 2023, the disclosure of which is hereby incorporated by reference in its entirety herein.

INTRODUCTION

The present disclosure relates to vehicle displays and systems, such as but not necessarily limited to dynamically enhancing operation of a display to support the presentation of video images in a manner operable to counteract external factors influencing symbology of human visibility.

Electronic displays may be included in vehicles, automobiles, etc. to facilitate presenting video images and/or other types of images, media, etc. to occupants. Such displays may include a screen or other type of human-machine interface (HMI) through which the video images may be presented. An ability to maintain symbology of human visibility for the video images may be related to capabilities of the display to present the video images in a manner matching or closely aligned with an intended visibility of the video images when received at the display within a video signal. In other words, an ability of the display to present the video images through the screen as depicted or originally intended within the video signal may reflect capabilities of the display to maintain symbology of human visibility. Due to displays, particularly those included within vehicles, operating in environments where various external influences may induce a wide variety of circumstances capable of disrupting the symbology of human visibility, such as from ambient light, forward looking light, temperature, etc., it may be desirable to dynamically adjust presentation of the video images according to such external influences.

SUMMARY

One aspect of the present disclosure relates to a display system configured for dynamically adjusting an image signal to compensate for external factors. The display may include a backlight source or source driver(s), which may be global and/or addressable (i.e., local dimming or full array local dimming, or edge backlight), a transmissive display, and/or an emissive display (organic light-emitting diode (OLED) or microLED). The display may receive a video signal from an external source or generate its own video from an embedded source. The system may periodically receive input of ambient light conditions from an ambient light sensor and may apply a corresponding transformation to a gamma transfer function, other type of transfer function, or other characteristic of the display, such as to thereby improve the perceived ambient contrast ratio. The system may optionally receive information about the video content and adapt the transformation accordingly.

One aspect of the present disclosure relates to a display system including a display subsystem, an ambient light sensor, a host microcontroller and/or additional peripheral circuitry, e.g., memory, processors, etc. The display system may utilize a communication link between one or more source drivers of the display subsystem and the host microcontroller, which may rely upon communication speeds capable of updating the image contents once per frame or at another desirable intervals. Alternatively, slower update rates may be considered to match the physiological response of the human eye to light stimulus. When employed in automotive applications, for example, the display system may employ a frame rate of or about 60 Hz, and, for example, in gaming applications a frame rate of or about as high as 240 Hz or more may be employed. The light sensor input may be filtered to accommodate pupillary responses to changes in ambient brightness (e.g., the pupil may contract faster than it dilates). The source drivers may allow for dynamic gamma transfer function adjustments or other adjustments to transfer functions. In the case of gamma transfer functions, the gamma function may refer to a transformation of the per-pixel luminance over a given brightness scale from 0-100%, however, other mathematical relationships than the gamma transfer function may be utilized.

A gamma value may be derived from a relational transformation between filtered light input and desired gamma output. From this relational transformation, a mathematical function or a lookup table may be generated, however, non-gamma based transformations may also be used. The relational transformation may also accept secondary inputs, such as a histogram of the source video image or a coefficient value which numerically describes the image contents. For transmissive displays, a relationship may be created between applied voltage and a given pixel's transmission rate, and for an emissive display, a relationship may be created between applied current and subpixel luminance. The mathematical relationship or lookup table described herein may be transformed based on the relationship between transmission and voltage and/or the relationship between current and luminance and the desired gamma exponent. This may be used to determine the new drive voltages (for transmissive displays) or new current adjustments (emissive displays) to achieve the desired gamma curve. The microcontroller may communicate to the display source driver the new gamma setpoint voltages, and thereby transform the output image of the display. Because the transformation may occur at a last step of the video path, it may be compliant with functional safety systems which do a checksum verification between the source and target, which may differ from digital processes whereby a lossy algorithm may be used.

One aspect of the present disclosure relates to a method for dynamically enhancing video images presented through an electronic vehicle display. The method may include measuring external factors influencing symbology of human visibility for the video images to be presented through the display, receiving imaging properties for the video images, identifying a plurality of nominal setpoints for one or more source drivers of the display, and processing the external factors, the imaging properties, and the nominal setpoints according to an image enhancement process. The image enhancement process may include adjusting one or more of the nominal setpoints to create a plurality of enhanced setpoints operable for maintaining symbology of the video images when influenced by the external factors.

The method may include identifying the nominal setpoints from a nominal video transfer function of the display, optionally with the nominal video transfer function cross-referencing each of the nominal setpoints relative to display current or voltages for the display and gray shade values included as at least part of the imaging properties for the video images.

The method may include specifying the enhanced setpoints within an enhanced video transfer function operable for use with the display, optionally with the enhanced video transfer function cross-referencing each of the enhanced setpoints relative to the display current or voltages and the gray shade values.

The method may include generating a setpoint message for use in conveying the enhanced video transfer function to the source drivers, optionally with the setpoint message delineating the enhanced setpoints to be used when presenting the video images through the display.

The method may include generating a display luminance control message for use in conveying display luminance control values to the display, optionally with the display luminance control values dynamically varying a luminance of the display as a function of the external factors.

The method may include delineating the enhanced setpoints within a lookup table configured for cross-referencing each of the enhanced setpoints relative to the display current or voltages and the gray shade values.

The method may include the source drivers interpolating the display current or voltages for the gray shade values beyond the gray shade values specified with the enhanced setpoints.

The method may include selecting the enhanced setpoints to adjust gamma characteristics for the display relative to the nominal setpoints.

The method may include selecting the enhanced setpoints based at least in part on a histogram of the video images.

The method may include the gamma characteristics of the display being defined according to a gamma transfer function represented as:

$$L = L_{max}\left(\frac{Gs_{in}}{Gs_{max}}\right)^{\gamma}$$

where:

- L is an output luminance of the display;
- $L_{max}$ is a maximum display luminance of the display;
- $GS_{in}$ is an input gray shade value for a given pixel of the display;
- $GS_{max}$ is a maximum possible gray shade value for a given pixel; and
- $\gamma$ is a gamma characteristic of the display.

The method may include presenting the video images through the display according to the enhanced setpoints.

The method may include presenting the video images without remapping of the gray shade values for the video images.

The method may include deriving the external factors from one or more of an ambient light sensor configured for sensing an ambient light visible to an occupant of a vehicle having the display, a forward looking light sensor configured for sensing a forward looking light visible to the occupant while viewing an area over top of the display, a biometric sensor configured for sensing pupillary responses and/or a pupil diameter of the occupant while viewing the display, and a camera configured for recording video images of the vehicle, the display, and/or an ambient environment inside and/or outside of the vehicle.

The method may include the display configured as a transmissive display.

The method may include the display configured as an emissive display.

One aspect of the present disclosure relates to a display system for a vehicle. The display system may include a display operable within the vehicle for presenting video images received in an input video signal to an occupant of the vehicle, an external factors controller configured form determining external factors influencing symbology of human visibility for the video images to be presented through the display, and an image enhancement controller configured for receiving imaging properties for the video images, processing the external factors and the imaging properties according to an image enhancement process, optionally with the image enhancement process creating a plurality of enhanced setpoints operable for maintaining symbology of the video images against the external factors, and directing the display to present the video images according to the enhanced setpoints.

The display system may include the image enhancement controller configured for selecting the enhanced setpoints according to a gamma transfer function or another transfer function, optionally with each of the transfer functions specifying the enhanced setpoints according to display current or voltages for the display and gray shade values for the video images.

The display system may include the display configured for presenting the video images according to the enhanced setpoints without remapping of gray shade values specified for the video images within the input video signal.

One aspect of the present disclosure relates to a controller for dynamically enhancing video images presented through an electronic display of a vehicle. The controller may be configured for measuring an ambient light influencing symbology of human visibility for the video images to be presented through the display, generating a plurality of enhanced setpoints operable for maintaining symbology of the video images against the ambient light, and directing the display to present the video images according to the enhanced setpoints such that the symbology of the video images is maintained against the ambient light without the display remapping gray shade values specified for the video images.

The controller may be configured for directing the display to present the video images according to luminance control values, optionally with the luminance control values dynamically varying a luminance of the display as a function of the ambient light.

The above features and advantages along with other features and advantages of the present teachings are readily apparent from the following detailed description of the modes for carrying out the present teachings when taken in connection with the accompanying drawings. It should be understood that even though the following Figures and embodiments may be separately described, single features thereof may be combined to additional embodiments.

BRIEF DESCRIPTION OF THE DRAWINGS

The accompanying drawings, which are incorporated into and constitute a part of this specification, illustrate implementations of the disclosure and together with the description, serve to explain the principles of the disclosure.

FIG. 12 illustrates an enhanced setpoint graph in accordance with one non-limiting aspect of the present disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
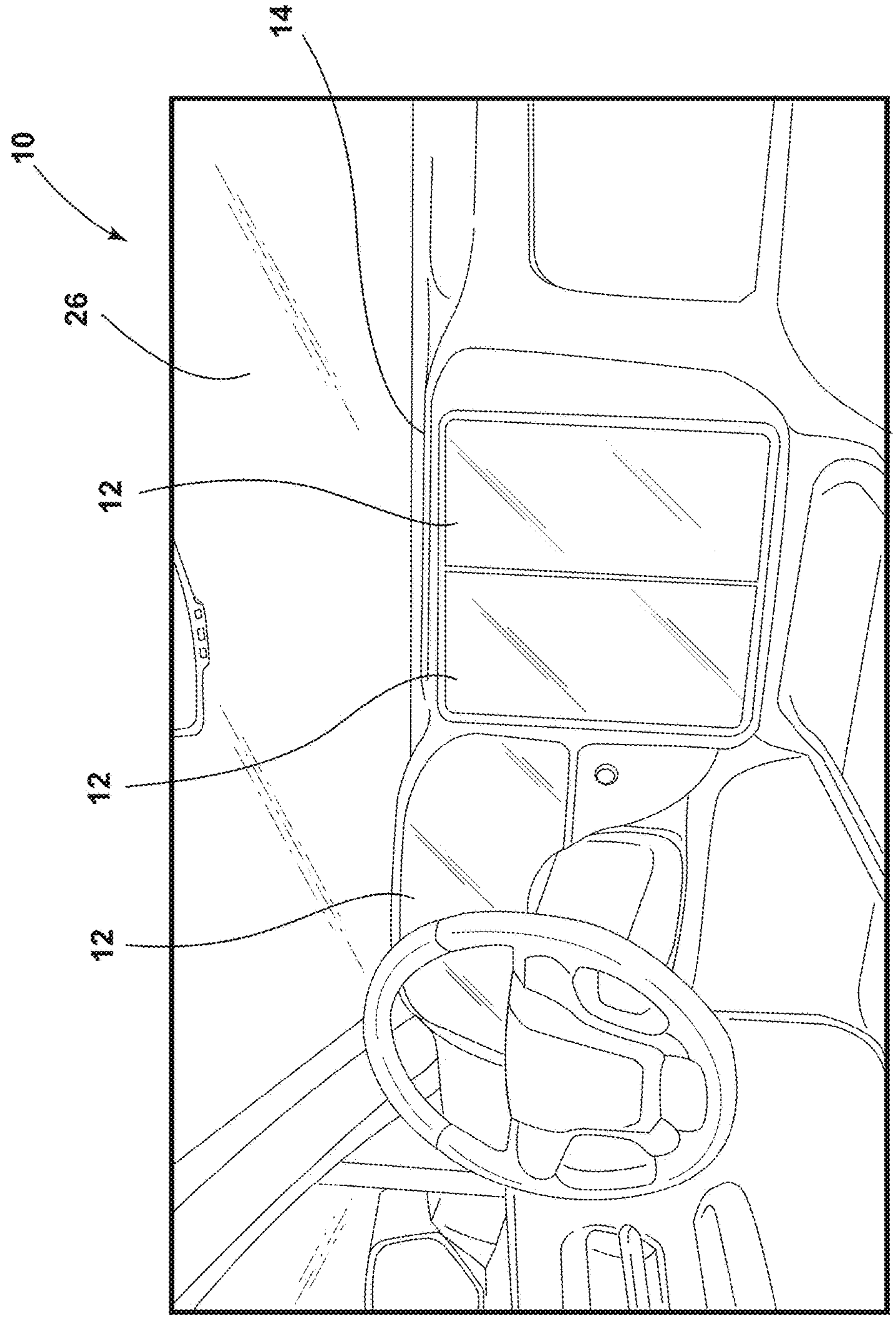
FIG. 1 illustrates a partial perspective view of a vehicle having a plurality of displays in accordance with one non-limiting aspect of the present disclosure.

FIG. 1 illustrates a partial perspective view of a vehicle 10 having a plurality of displays 12 in accordance with one non-limiting aspect of the present disclosure. The vehicle 10 is shown for non-limiting purposes as being an automobile having the displays 12 disposed within a dashboard 14 to demonstrate advantageous capabilities of the present disclosure to dynamically enhance and improve operation of the displays 12 to support presentation of video images, media, etc. in manner operable to counteract external factors influencing symbology of human visibility. The vehicle 10 is described as being an automobile, however, the present disclosure fully contemplates other types of displays 12 and display arrangements, including those found in other vehicles, such as trucks, motorcycles, watercraft, trains, and/or aircraft, and/or as part of other moveable or stationary, non-vehicle objects, such as but not limited to, televisions, billboards, kiosks and/or marquees. The display 12 may include various configurations, including but not necessarily limited to global and/or addressable displays (i.e., local dimming or full array local dimming, or edge backlight), a transmissive display, and/or an emissive display (OLED or microLED). The present disclosure nonetheless fully contemplates its use and application with other types of displays 12 having capabilities for selectively, discreetly, independently, individually, or otherwise dynamically enhancing image presentation in the manner contemplated herein.

Figure 2:
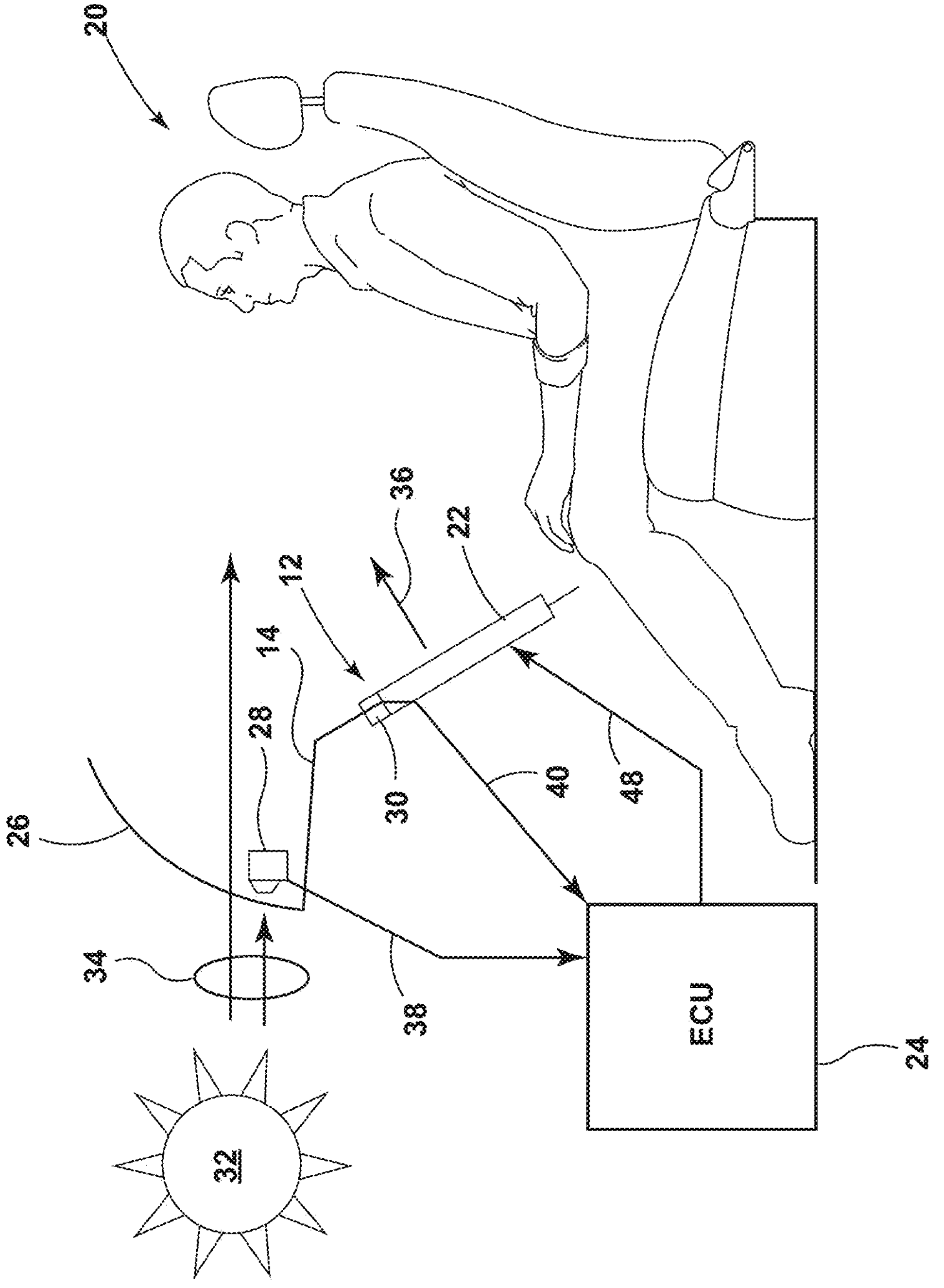
FIG. 2 illustrates a diagram of a vehicle occupant positioned relative to an exemplary display in accordance with one non-limiting aspect of the present disclosure.

FIG. 2 illustrates a diagram of a vehicle occupant 20 positioned relative to an exemplary one of the displays 12 in accordance with one non-limiting aspect of the present disclosure. The occupant 20 may correspond with a driver in a driver's seat of the vehicle and/or an occupant elsewhere in the vehicle. The display 12 may include a face or front surface 22, such as a screen or other human-machine interface (HMI). The vehicle may include an electronic control unit 24, a windshield 26, a forward looking light sensor 28, and an ambient light sensor 30. The sun 32 may present a forward looking light 34 that passes through the windshield 26 and is received by the forward looking light sensor 28 such that the driver 20, at least while looking up or over top of the display 12 and/or otherwise out through the windshield 26 or other window, may also see the forward looking light 34. An ambient light 36 may be visible to the driver 20 from directions other than from the sun 32. The ambient light 36 may arise from reflections of the light from the sun 32, other lights around the vehicle (e.g., streetlights), lights within the vehicle (e.g., dome lights), other vehicle headlights, and the like. While the driver 20 may be looking down at the face 22 of the display 12 and/or at the instrument panel 14, the driver may see the ambient light reflection 36 directly, whereas the forward looking light 34 may be out of direct view.

The ECU 24 may be in electrical communication with the forward looking light sensor 28, the ambient light sensor 30, the display 12, and/or other componentry of circuits to facilitate the dynamic image enhancement contemplated herein. The ECU 24 may receive a forward luminance value 38 from the forward looking light sensor 28 that may be proportional to an intensity of the forward looking light 34 sensed thereby. The ECU 24 also receive an ambient luminance value 40 from the ambient light sensor 30 that may be proportional to an intensity of the ambient light 36 sensed thereby. A biometric sensor (not shown) may be configured for providing a biometric signal to the ECU 24, such as in response to sensing pupillary responses and/or a pupil diameter of the occupant while viewing the display 12. A camera (not shown) may be configured for providing a recorded signal to the ECU 24, such as in response to recording video images of the vehicle, the display 12, and/or and ambient environment inside and/or outside of the vehicle. The forward looking light sensor 28, the ambient light sensor 30, the biometric sensor, the camera, and/or additional sensors or diagnostics tools included onboard the vehicle, or communication therewith, such as via wireless signaling, may be utilized in accordance with the present disclosure to facilitate assessing external factors influencing symbology of human visibility for the video images presented through the display 12. The ECU 24 may be configured to direct or otherwise control the display 12 utilizing messages, signals, information, etc. transferred via a communication medium 48.

Figure 3:
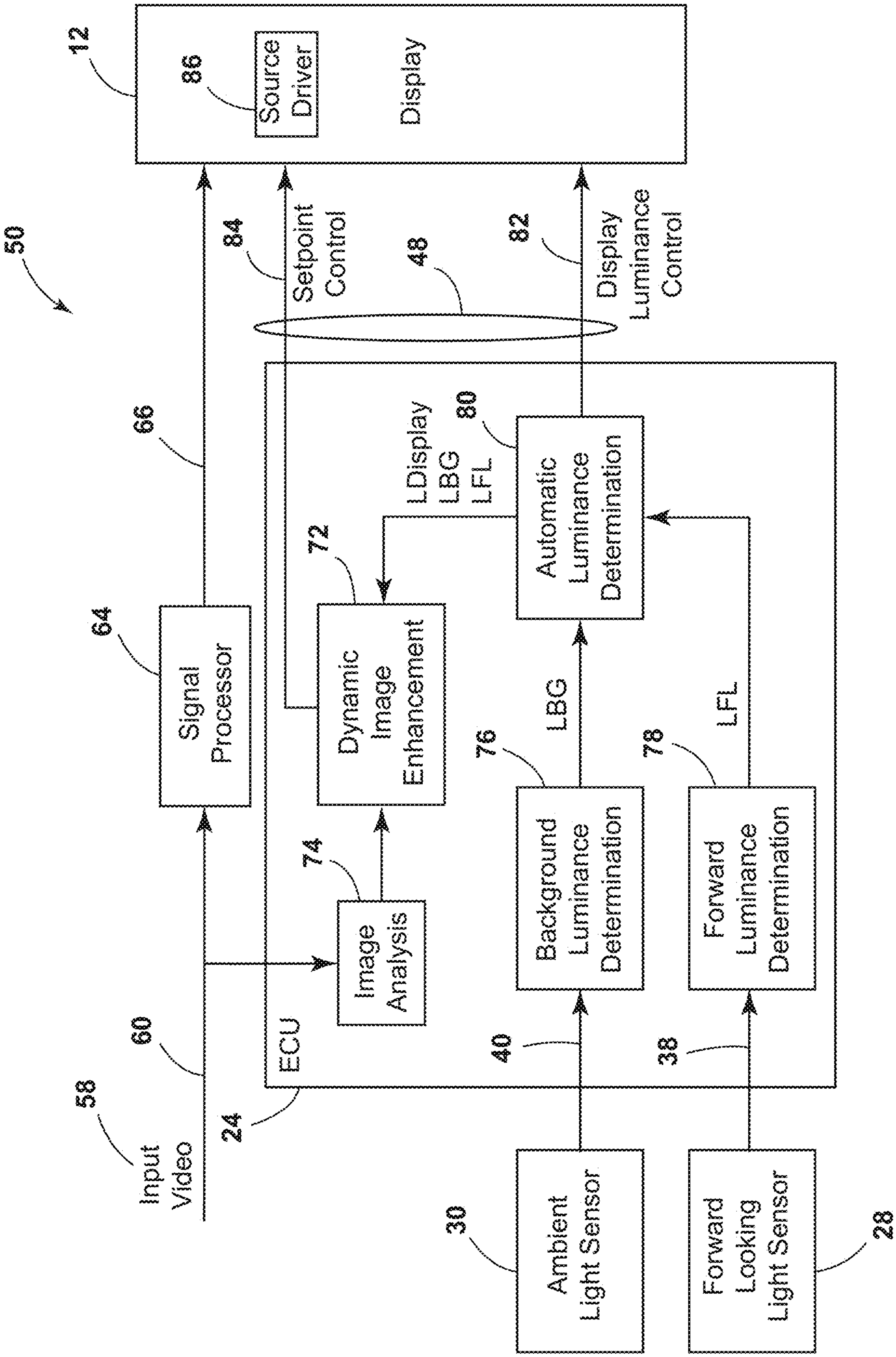
FIG. 3 illustrates a schematic diagram of a display system in accordance with one non-limiting aspect of the present disclosure.

FIG. 3 illustrates a schematic diagram of a display system 50 in accordance with one non-limiting aspect of the present disclosure. The display 12 system may include a signal processor 64, the ECU 24, and/or one or more of the displays 12. The ECU 24 may be configured in accordance with the present disclosure to facilitate dynamically enhancing operation of the display 12 to support the presentation of video images in manner operable to counteract the external factors influencing symbology of human visibility. As noted above, a wide variety of external factors may influence symbology of the presented video images, however, for the sake of presentation, the dynamic image enhancement is predominately described with respect to external influences associated with the ambient light 36 and the forward looking light 34, i.e., the external influences respectively sensed with the ambient light sensor 30 and the forward looking light sensor 28. This is done without limitation as the present disclosure fully contemplates including and/or compensating for other external factors, such as but not necessarily limited to those described above with respect to the biometric sensor and the camera. The ECU 24, for example, may be configured to assess a vast quantity of external influences when providing the dynamic image enhancement contemplated herein, optionally with suitable sensors, circuits, etc. to support the use thereof and may also employ artificial intelligence to determine the image enhance transfer.

An input video 58 may be configured for receiving an input video signal 60, such as one including video images, media, etc. from an external source and/or an entity onboard the vehicle and/or in communication therewith. The video input 58, for example, may be utilized in cooperation with the additional subsystems onboard the vehicle to facilitate display 12 video images and otherwise communicating information with vehicle occupants 20 through one or more of the displays 12. A signal processor 64 may be configured to operate independently of the ECU 24 for purposes of recovering the video images or other media from the video input signal 60 and generating a video output signal 66 for presentation through the display 12. The signal processor 64 may be configured as a video converter operable for converting the video images to those suitable for presentation through the display 12, which may vary depending on the type and capabilities of display 12. The signal processor 64 is shown to be independent of the ECU 24 for non-limiting purposes in order to highlight one advantageous aspect of the present disclosure whereby presentation of the video images may be made without having to remap gray shade values or to otherwise perform complex or dedicated conversion processes on the video images. The present disclosure, optionally instead, may be operable to essentially pass through the video images to the display 12 without making adjustments to the gray shade values or other image content manipulations to account for the external influences affecting symbology of human visibility.

The ECU 24 may be configured to operate according to a plurality of non-transitory instructions stored on a non-transitory computer-readable storage medium, which when executed with one or both processors, may be operable for facilitating the operation contemplated herein. The ECU 24, for example, may be configured for communicating with the forward looking light sensor 28 to receive the forward luminance value 38 and the ambient light sensor 30 to receive the ambient luminance value 40. The ECU 24 may include a dynamic image enhancement block 72, an image analysis block 74, a background (or ambient) luminance determination block 76, a forward luminance determination block 78, and an automatic luminance determination block 80. These blocks, the operations associated therewith, and/or the other elements shown may be included as part of the ECU 24, however, the present disclosure fully contemplates one or more of the blocks and/or the operations associated therewith being performed or generated from or based on sources offboard the ECU 24, such as with the corresponding information, data, outputs, etc. being generated or provided from a source, host, or other feature and thereafter communicated to the ECU 24. The capability to perform some of the illustrated functions outside of the ECU 24, such as with a graphics processing unit (GPU) or host, may be beneficial in ameliorating the complexities of the ECU 24 and/or to permit some of the described operations to be performed in software, with algorithms, etc. offboard the ECU 24. A display luminance control value 82 may be generated by the ECU automatic luminance determination block 80 and transferred to the display 12. The blocks 72 to 80 may be implemented in hardware and/or software executing on the hardware. The video input signal 60 may be received by the image analysis block 74. The forward luminance value 38 may be received by the forward looking luminance determination block 78. The ambient luminance value 40 may be received by the background luminance determination block 76.

The ambient illumination shining on/reflected from the display 12 may be measured by ambient light sensor 30 and the illumination Lux level may be communicated to the background luminance determination block 76. The background luminance determination block 76 may determine background luminance (LBG) information of the ambient light 36 observed on the front face of the display 12. The background luminance LBG information may be relayed to the automatic luminance determination block 80. The automatic luminance determination block 80 may use the background luminance LBG information received from the background luminance determination block 76 to determine the desired display luminance control value 82. The display luminance control value 82 may be used by the display 12 to control the luminance level of the display 12. Display luminance (LDisplay) information (e.g., the display luminance control value 82 internal to the ECU 24) may be transferred to the dynamic image enhancement block 72. In parallel to the ambient (background) luminance processing, the forward looking light sensor 28 may be configured to measure the forward looking luminance value 38 seen by the driver when looking through the windshield. In addition to controlling the display 12 luminance as a function of the ambient luminance value 40, display 12 visibility performance may be improved by the utilization of the forward looking light sensor 28 to compensate for conditions of transient adaptation or eye adaptation mismatch. When the driver 20 looks at a bright scene, such as a sunrise or sunset, the display 12 luminance may be increased since the pupils of the driver 20 may be constricted and thus may require more display 12 luminance for image visibility. Under the sun rise/sunset scenarios, the ambient light sensor 30 may be shaded and, without the use of the forward looking light sensor 28, may cause the display 12 luminance to be decreased. The implementation of the forward looking light sensor 28 may thus allow the display 12 luminance to be properly controlled to increase the display 12 luminance where appropriate.

An illuminance Lux level of the forward looking light sensor 28 may be conveyed to the forward luminance determination block 78. The forward luminance determination block 78 may determine forward looking luminance (LFL) information for the forward looking light. The forward looking luminance LFL information may be transmitted to the automatic luminance determination block 80. The automatic luminance determination block 80 may use the information in conjunction with the background luminance level LBG information to determine an appropriate display luminance control value 82. One non-limiting aspect of the present disclosure contemplates the dynamic image enhancement being configured for selecting or otherwise creating a plurality of enhanced setpoints 84 operable for maintaining symbology of the video images against the external factors, i.e., against the ambient and forward looking light 34, 36. The enhanced setpoints 84 may be selected relative to nominal or typical setpoints 84 of the display 12. The display 12, for example, may be manufactured with a plurality of nominal setpoints and/or a nominal transfer function, such as those typically used to operate a source driver 86 thereon. In the event the display 12 lacks nominal setpoints, the enhanced setpoints 84 may be determined anew or set each time the display 12 is in use. The source driver 86 may be configured as a source driver integrated circuit (SDIC) or other logically executing feature included within software and/or hardware capable of varying or changing setpoints according to a setpoint message or signal received from the dynamic image enhancement block.

Figure 4:
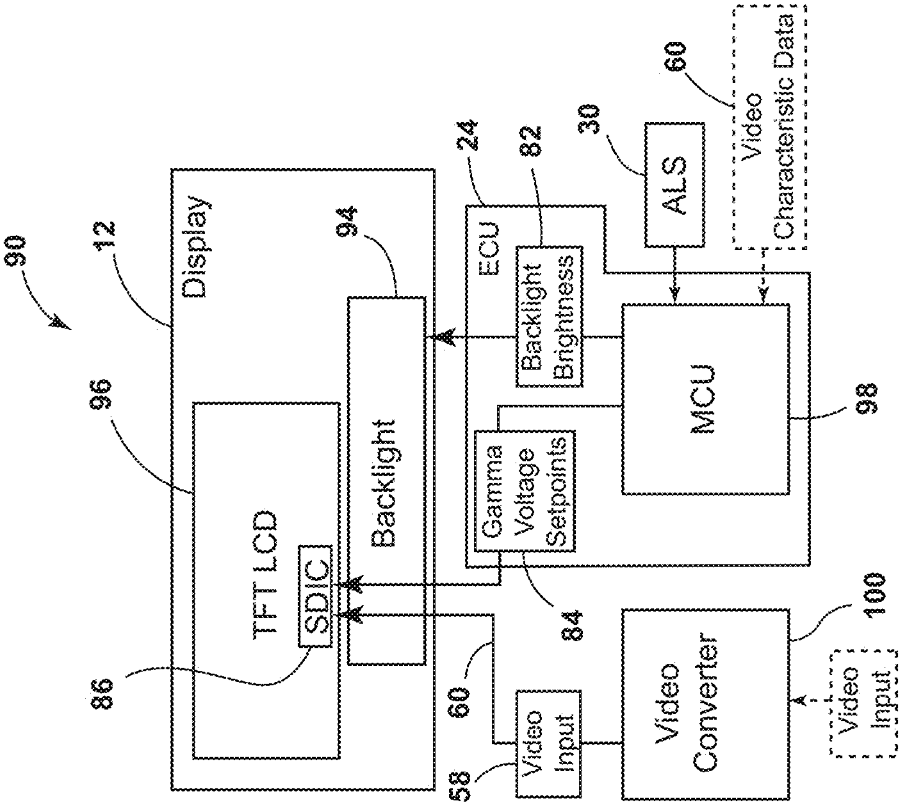
FIG. 4 illustrates a transmissive display system in accordance with one non-limiting aspect of the present disclosure.
Figure 5:
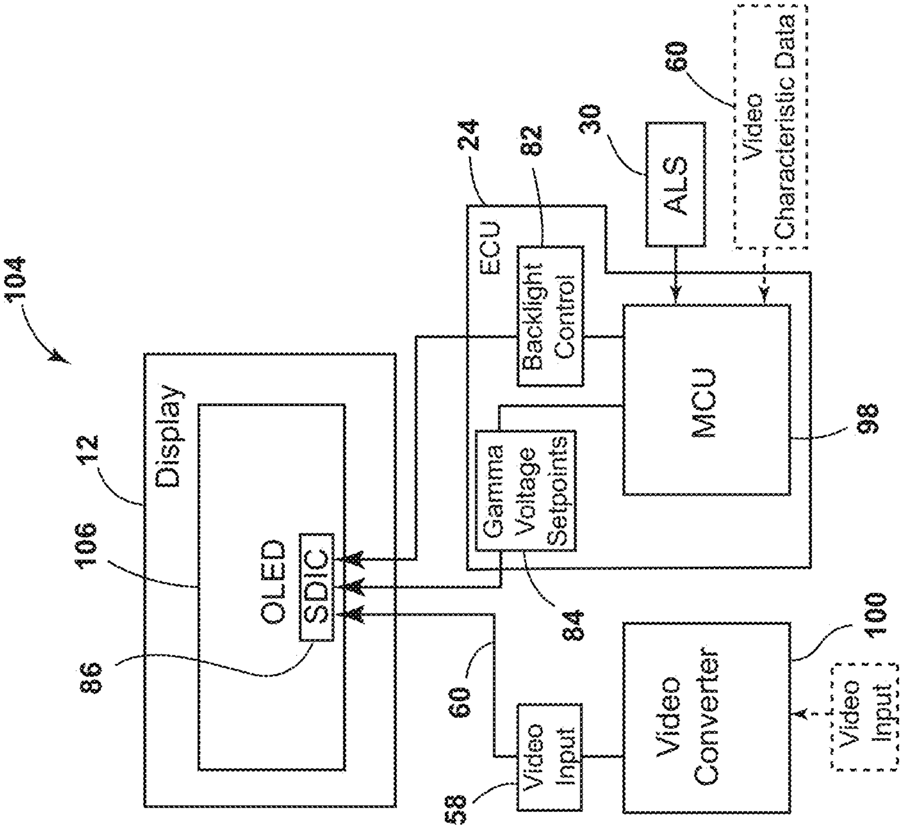
FIG. 5 illustrates an emissive display system in accordance with one non-limiting aspect of the present disclosure.

The enhanced setpoints 84, accordingly, may be generated according to an enhanced video transfer function and relative to the nominal setpoints and/or other design or predefined characteristics of the display 12 and/or the source driver 86. The source driver 86, for example, may be configured to apply voltages and/or currents globally to particular pixels, optionally on a row-by-row and column-by-column basis, to facilitate selectively setting and varying the per-pixel coloring used to present the video images or other media, i.e., setting the voltages and/or currents needed for each pixel. FIG. 4 illustrates a transmissive display system 90 in accordance with one non-limiting aspect of the present disclosure. The transmissive display system 90 may include the display 12 having a backlight 94 to facilitate lighting a thin-film-transistor liquid-crystal display (TFT LCD) 96, whereby the display luminance control value 82 may be used for controlling or otherwise operating the backlight 94 and the enhanced setpoints 84 may be used for controlling or otherwise operating the TFT LCD 96. A micro controller unit (MCU) 98 may be configured for performing one or more of the above described operations and/or a video converter 100 may be included to operate independently of the ECU 24 and/or the MCU 98 to facilitate separate video processing. FIG. 5 illustrates an emissive display system 104 in accordance with one non-limiting aspect of the present disclosure. The emissive display system 104 may include the display 12 having an OLED display 106, whereby the enhanced setpoints 84 may be used for controlling or otherwise operating OLED display 12.

The enhanced setpoints 84 contemplated herein may be calculated by the dynamic image enhancement block 72, and optionally adapted according to the type or configuration of the display 12, to facilitate counteracting external factors influencing symbology of human visibility for the video image to be presented. The enhanced setpoint 84 values may be those associated with controllable parameters of the source driver 86 capable of setting one or more transfer functions for the display 12, i.e., controllable parameters of the display 12 operable for controlling the presentation of video images. The transfer functions may correspond with lookup tables, mathematical representations, logic, or other dynamic features capable of selectively controlling voltages and/or current utilized to operate the display 12. While other transfer functions are contemplated and may be similarly employed, one non-limiting aspect of the present disclosure contemplates the enhanced setpoints 84 being selectable to correspondingly define a gamma function or gamma response for the display 12, optionally on a frame-by-frame basis. Instead of trying to maintain the desired display 12 gamma at a fixed value, e.g., 2.2, the present disclosure relates to dynamically modifying a transmission versus gray shade function within the display 12 by sending the desired gamma voltage setpoint 84 information to the display 12 via a communication interface, such as I2C or SPI.

Figure 6:
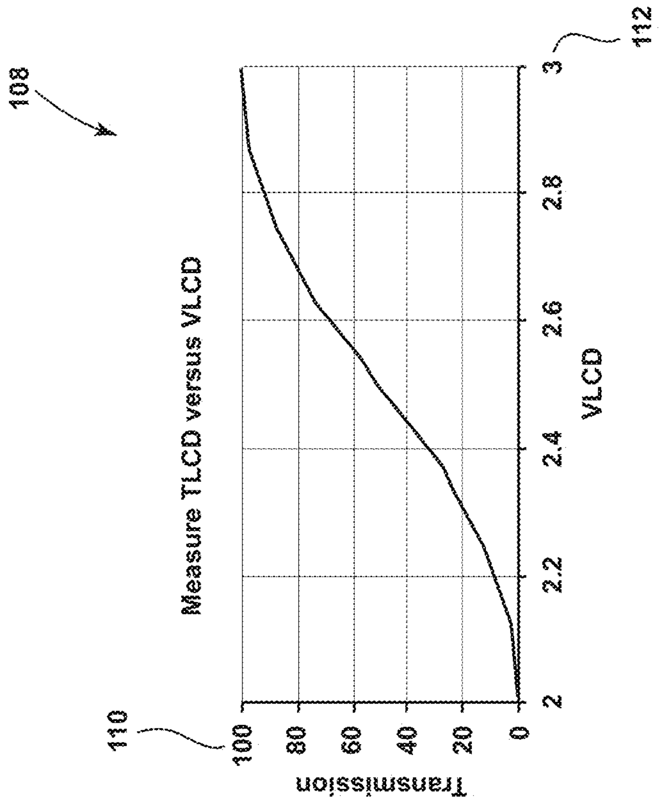
FIG. 6 illustrates a graph of transmission versus voltage for a transmissive display in accordance with one non-limiting aspect of the present disclosure.

The desired transfer function may be determined as a function of the light sensor inputs 38, 40 and the display 12 operational luminance. If available, the dynamic image enhancement block 72 may also receive information from graphics generation units providing video histogram information or from general screen types, such as cluster, map, etc. The histogram or screen type information may be generated with the ECU 24 and/or from an external source or host and used to determine where a majority of the image gray shades, which may then be used in accordance with the present disclosure to optimize the image transfer information sent to the display 12 via gamma voltage set points. The process to determine the gamma voltage set points to the display 12 may start with measuring transmission versus voltage for a transmissive TFT LCD display 12. FIG. 6 illustrates a graph 108 of transmission versus voltage for a transmissive display 12 in accordance with one non-limiting aspect of the present disclosure. A vertical axis 110 may be used to represent transmission of the display 12 relative to liquid crystal voltages (VLCD) delineated along a horizontal axis 112.

The alternating voltages that may be required to maintain zero net DC voltage across the liquid crystal are not elucidated as one skilled in the art would appreciate such values to be common in the LCD industry, i.e., most TFT LCD source drivers 86 employ gamma voltage set points that establish the gamma transfer function. In some older drivers, these voltages may be set with resistive divider strings or other methods such as digital to analog converters. In newer source drivers 86, these voltages may be set via a communication bus such as I2C or SPI with the driver 86. The number of voltage and/or current points may vary, such as 8, 16 or even higher number of setpoints 84, for better control over the transfer function. These voltage and/or current setpoints 84 may be selected in accordance with the enhancement processes described herein and associated with discrete gray shade values, with the voltages therebetween being interpolated by the driver 86.

Figure 7:
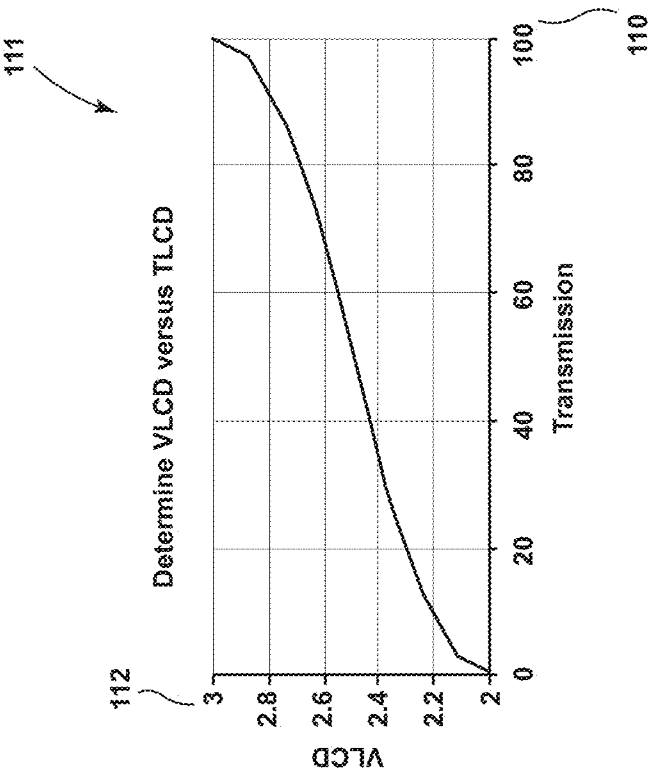
FIG. 7 illustrates liquid crystal voltages versus transmission function in accordance with one non-limiting aspect of the present disclosure.

The LCD transfer function, as shown in FIG. 6, may be manipulated to reverse the axes to provide the VLCD versus transmission function as shown in a corresponding graph 111 of FIG. 7. The desired transfer function may be determined according to the following equation.

$$T = T_{Max}\left(\frac{GS}{GS_{Max}}\right)^{\gamma} \qquad \text{(Equation 1)}$$

where T=transmission, $T_{Max}$=maximum display transmission, GS=video gray shade number, $GS_{Max}$=maximum video gray shade number, and $\gamma$=display gamma value.

Equation 1 may also be normalized in terms of a percentage basis as shown in the following equation:

$$T\ \% = 100\%\left(\frac{GS}{GS_{Max}}\right)^{\gamma} \qquad \text{(Equation 2)}$$

Figure 8:
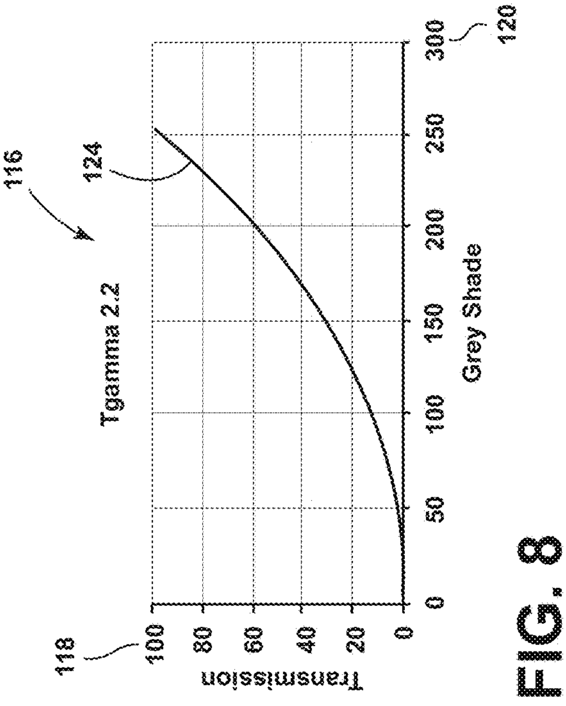
FIG. 8 illustrates a diagram of a gamma transfer function w in accordance with one non-limiting aspect of the present disclosure.
Figure 9:
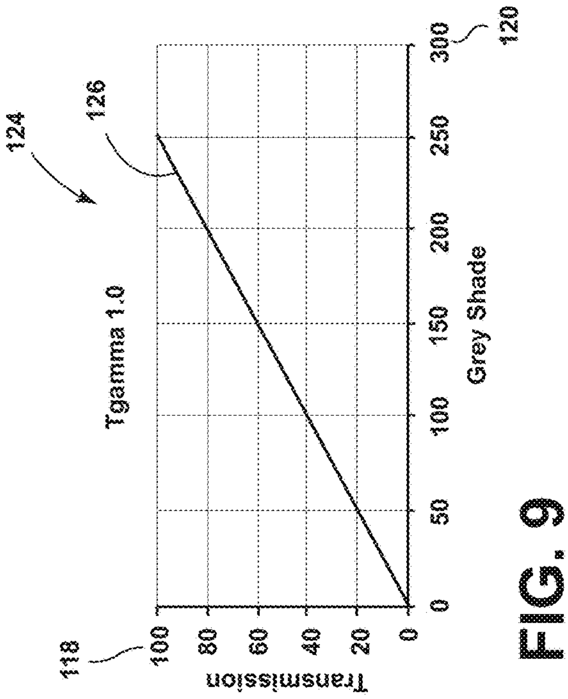
FIG. 9 illustrates a diagram of another gamma function in accordance with one non-limiting aspect of the present disclosure.
Figure 10:
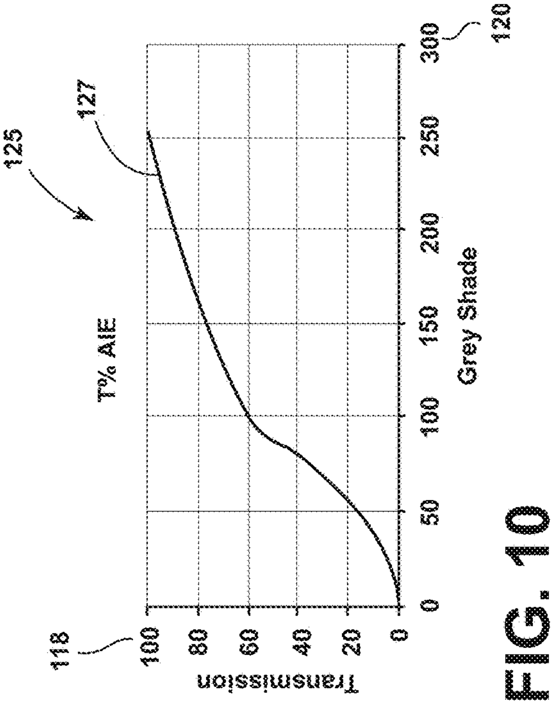
FIG. 10 illustrates a plurality of enhanced setpoints in accordance with one non-limiting aspect of the present disclosure.

One non-limiting aspect of the present disclosure contemplates utilizing the VLCD versus transmission function 110 diagrammed in FIG. 7 to facilitate selecting the enhanced setpoints 84. In the case of the transfer function corresponding with the gamma transfer function, the enhanced setpoints 84 may be selected relative to particular gamma values. FIG. 8 illustrates a graph 116 of the gamma transfer function when a gamma value of 2.2 is used for relating transmission values specified in a vertical axis 118 with gray shade values specified in a horizontal axis 120. FIG. 9 illustrates a graph 124 of the gamma function when the gamma value of 1.0 is used for relating transmission values specified in a vertical axis 118 with gray shade values specified in a horizontal axis 120. FIG. 10 illustrates a graph 125 of another type of transfer function used for relating transmission values specified in a vertical axis 118 with gray shade values specified in a horizontal axis 120. A wide variety of gamma values besides the exemplarily illustrated values of 2.2 and 1.0 may be utilized in this manner to define gamma curves 124, 126, 127 operable for relating transmission to gray shade values. The gamma values, or more specifically the gamma functions, may be selectively determined in accordance with the present disclosure based on the ambient and/or forward looking light sensor values 38, 40, i.e., based on light sensors 28, 30 used to represent corresponding external factors capable of influencing symbology of human visibility for the video images to be presented through the display 12.

Figure 12:
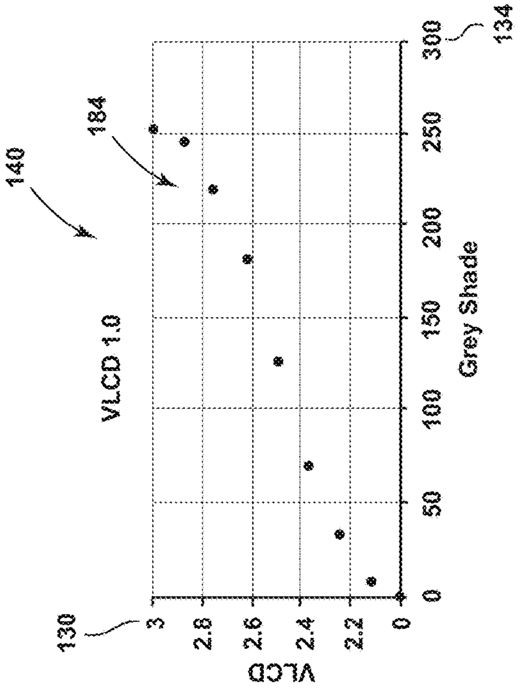
FIG. 12 illustrates a flowchart of method for dynamically enhancing video images in accordance with one non-limiting aspect of the present disclosure.
Figure 11:
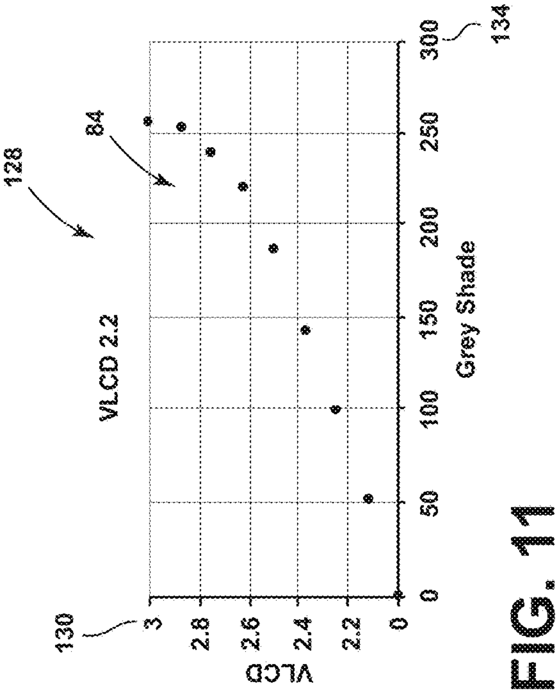
FIG. 11 illustrates another plurality of enhanced setpoints in accordance with one non-limiting aspect of the present disclosure.
Figure 13:
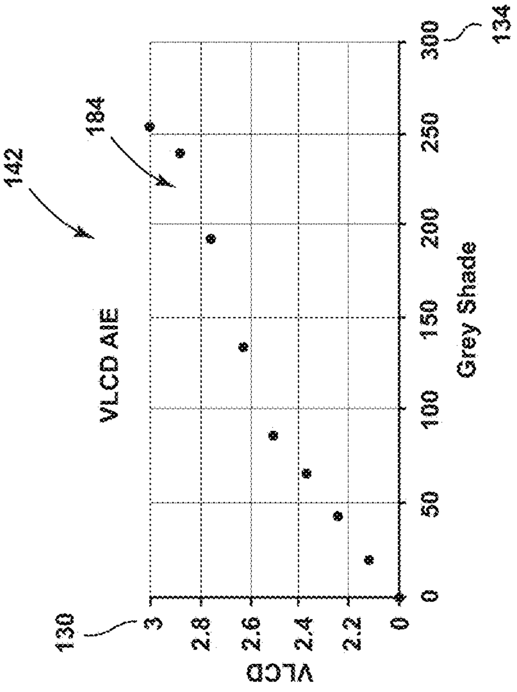
FIG. 13 illustrates an enhanced setpoint graph in accordance with one non-limiting aspect of the present disclosure.

FIG. 11 illustrates an enhanced setpoint graph 128 for a plurality of enhanced setpoints 84 selected to provide a gamma value 2.2 in accordance with one non-limiting aspect of the present disclosure. The enhanced setpoints 84 are selected for non-limiting purposes to correspond with nine discrete setpoints 84 (shown with circles) defined relative to VLCD values specified in a vertical axis 130 and gray shade values specified in a horizontal axis 134. FIG. 12 illustrates an enhanced setpoint graph 140 for a plurality of enhanced setpoints 84 selected to provide a gamma value 1.0 in accordance with one non-limiting aspect of the present disclosure. FIG. 13 illustrates an enhanced setpoint graph 142 for a plurality of enhanced setpoints 84 selected according to the another transfer function in accordance with one non-limiting aspect of the present disclosure. The enhanced setpoints 84 may be selected for non-limiting purposes to correspond with nine discrete setpoints 84 (shown with circles) defined relative to VLCD values specified in a vertical axis 130 and gray shade values specified in a horizontal axis 134. The quantity of enhanced setpoints 84 may be variable depending on capabilities of the source driver 86, and as such, the illustrated quantity of setpoints 84 is merely exemplary. The enhanced setpoints 84 may be displayed in the illustrated manner and conveyed to the source driver 86 through corresponding signaling, messaging, etc. The setpoints 84, for example, may be delineated in the graphical manner, within a lookup table, or through other table or formula sufficient for the identification thereof. The source driver 86 may be configured to perform interpolation for gray shade values falling between or outside of those specified within the enhanced setpoints 84.

Figure 14:
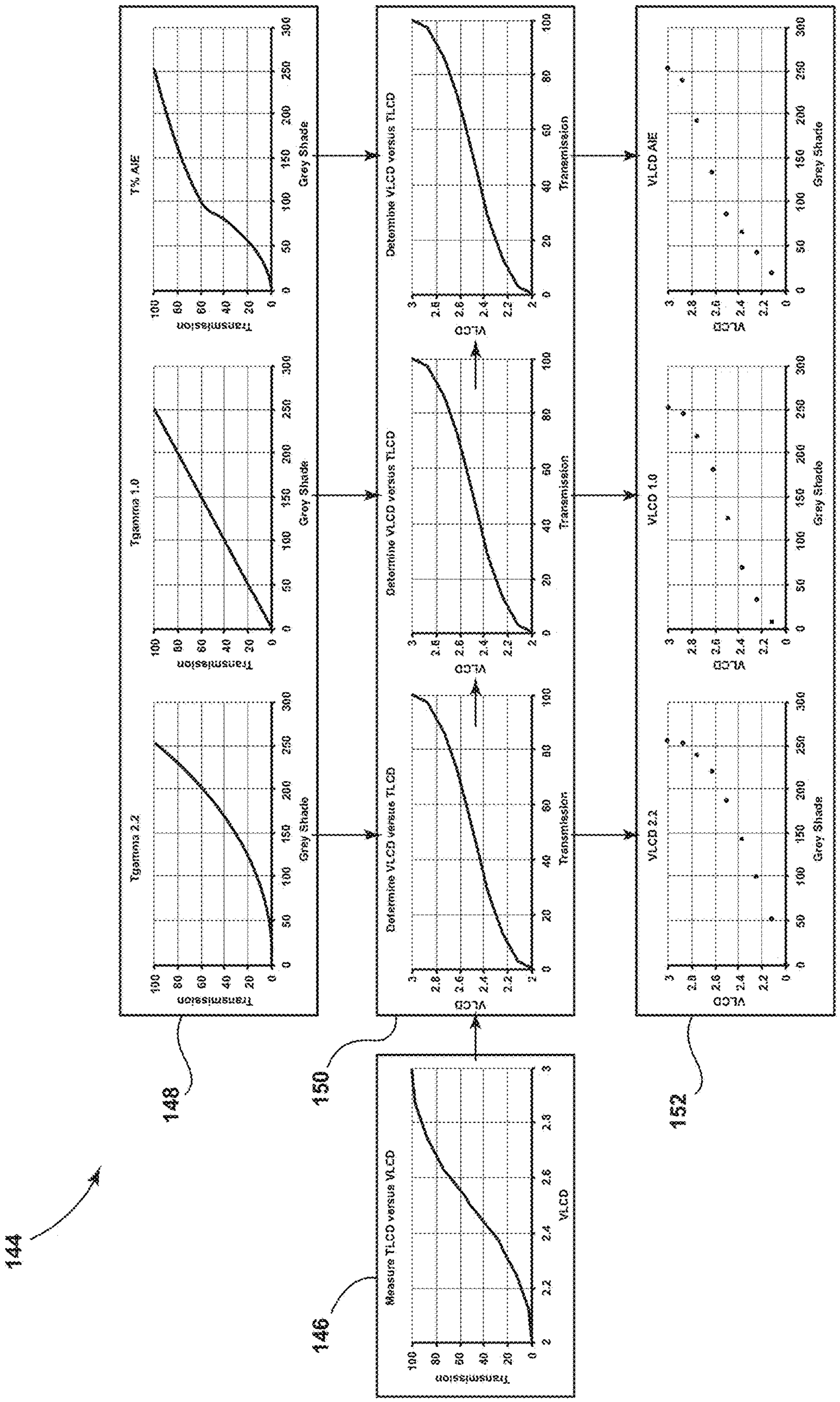
FIG. 14 illustrates a flowchart of method for dynamically enhancing video images in accordance with one non-limiting aspect of the present disclosure.

FIG. 14 illustrates a flowchart 144 of method for dynamically enhancing video images presented through an electronic vehicle display 12 in accordance with one non-limiting aspect of the present disclosure. The method may be operable to select enhanced setpoints 84 for the source driver 86 for purposes of correspondingly varying a transfer function thereof to compensate for external factors influencing symbology of human visibility. This, for example, may be useful in automotive applications where lower video gray shade content becomes less visible under reflected ambient lighting conditions, such as when a white poster board (e.g., white shirt) reflection of 387 nits from the passenger seat washes out the display 12 as seen by the driver for a display 12 with a 1.25% total SCI display 12 reflection rate. Considering a 387 nit reflected background luminance may require approximately 300 nits of display 12 luminance to be visible, 300 nits may equate to about gray shade 150 for a 1000 nit display 12. As such, for a typical cluster display 12, a corresponding amount of the lower gray shade content may not be visible. While not limiting, lower gray shade content may correspond with gray shades less than approximately 50 in a range of 0 to 255, with an intermediate grade shade content optionally corresponding with grade shade values between approximately 51 and approximately 200 and an upper grade shade content corresponding with gray shaded values greater than approximately 200.

One non-limiting aspect of the present disclosure contemplates utilizing the display luminance control value 82 in cooperating with the enhanced setpoints 84 to increase or decrease the luminance level of a display 12. This capability may be helpful in addressing the visibility of the upper gray shades in a video image. The lower gray shades, however, may nonetheless remain largely less visible due to the reflected luminance of the display 12 overwhelming and washing out the lower gray shade luminance levels. Because increasing the display 12 luminance may be insufficient to adequately maintain symbology of human visibility for lower video content visibility, one non-limiting aspect of the present disclosure contemplates correspondingly selecting the enhanced setpoints 84 on a frame-by-frame basis, and thereby the associated gamma function or other transfer function utilized by the source driver 86. The enhanced setpoints 84 may be used in this manner to improve visibility for lower video content, optionally to the extent of maintaining symbology of human visibility therefor within a predefined range or threshold such that the display 12 presents the video images in a manner matching or closely aligned with an intended visibility of the video images when received at the display 12 within the input video signal.

Block 146 relates to a characteristics process whereby the ECU 24 may determine operating characteristics and/or capabilities for the display 12. The characteristics process, for example, may include identifying nominal setpoints or other setpoint parameters for the display 12, e.g., the quantity, type, or other variables for the setpoints that may be usable with one or more transfer functions included with the display 12 or the source driver 86. The characteristics process may include determining the transmission versus the VLCD described above in FIG. 7. Block 148 relates to a value process whereby the ECU 24 may determine the gamma value or other values operable with the transfer function(s) determined in Block 146. The value process may relate to determining suitable gamma values for achieving or maintaining symbology of human visibility for the video images to be presented through the display 12. The gamma values may correspond with those illustrated in the gamma function diagrams of FIGS. 8, 9, and 10, which are shown for non-limiting purposes to correspond with gamma function values gamma values of 2.2 and 1.0 and an alternative transfer function. Block 150 relates to a relational process whereby the ECU 24 may relate the gamma values or other value determined in Block 148 with the characteristics determined in Block 146. The relational process may correspond with mathematically relating the transmission versus the VLCD of FIG. 7 with the gamma or other values determining Block 148. Block 152 relates to an image enhancement process whereby a plurality of enhanced setpoints 84 may be determined based on the relational process.

The enhanced setpoints 84 may correspond with those illustrated in the diagrams of FIGS. 11, 12, and 13.

The enhanced setpoints 84 may be used to define VLCD in axis 130 relative to gray shade values in the horizontal axis 134. The gray shade values may correspond with grade shade values specified within the input video signal 60 for the video images to be presented. One non-limiting aspect of the present disclosure contemplates the ECU 24 being configured to selectively vary the setpoint message transmitted to the display 12 on a frame-by-frame basis to maintain symbology of human visibility for the video images associated therewith. This may include the ECU 24, or more specifically the dynamic image enhancement block 72, selectively varying the enhanced setpoints 84 used for each frame so as to correspondingly manipulate presentation of the video images. The setpoints 84, for example, may be varied so as to address the above-described complications with respect to maintaining symbology for lower gray shade content, e.g., the enhanced setpoints 84 may be selected to correspondingly influence presentation of the lower gray shade content such that the lower gray shade content may maintain visibility when presented with the higher gray shade content. The source driver 86 may utilize the corresponding enhanced setpoints 84, i.e., transmission versus gray shade values of FIGS. 8, 9, and 10, to drive each pixel with voltage and/or current according to the gray shade values associated therewith, optionally with multiple pixels using differing setpoints 84, i.e., differing gamma values, at the same time.

The capability of the present disclosure to selectively generate enhanced setpoints 84 or to otherwise determine setpoints 84, optionally on a frame-by-frame basis, which may be achieved by deviating from or adjusting nominal setpoints 84 of the source driver 86, may be beneficial in maximizing symbology of human visibility for the video images without having to manipulate or otherwise transform the underlying content, e.g., without having to remap gray shade values or otherwise engage in costly and expensive manipulation of the content comprising the video images. While the present disclosure fully contemplates the ECU 24 including capabilities for image enhancement without adjusting the setpoints, such as within software, and/or without re-mapping gray shade values or otherwise directly manipulating the content of the video images, such as with the video converter 100, the capability to support symbology without having to reprogram or reconfigure the content may be advantageous in enhancing electronic displays 12 without the burdensome and expensive task of configuring new signal processors or other graphical elements of the display 12. The capabilities described herein, for example, may be particularly beneficial with general-purpose vehicle interface processors (VIPs) commonly employed within automotive products to facilitate operation of electronic displays 12. Rather than having to manipulate or otherwise reprogram such VIPs, the present disclosure may be operable with setpoint 84 controls typically included therewith such that the present disclosure may maintain symbology through manipulation of the setpoints 84 without having to correspondingly program or redesign other aspects of the VIPs.

The setpoints may be determined by starting with the desired transmission function 148 in FIG. 14, which may be determined as a function of ambient lighting conditions and type of display imagery information 60. Gray shade setpoints may be selected in accordance with the LCD transfer function 150 such that the gray shade set points may be chosen to be closer together in areas of high slope changes and further apart in areas of lower slope changes. Once the gray shade set points are selected, the desired transmission at each gray shade set point may be discovered in the selected LCD transfer function 150 such that the corresponding VLCD voltage may be found and associated with each gray shade set point resulting in the VLCD set points as shown in 152. These set points may be communicated to the display source driver(s) 86 at a rate necessary to support controlling the display 12 usually during the vertical blanking time. If there is no update to the setpoints, there is no need to update the source driver(s) 86. If there is a desired change in setpoints, the setpoint information may be communicated to the source driver(s) 86 during the next available time, such as during the vertical blanking time. The gray shade or other content related information used in selecting the setpoints 84 may be timed relative to presentation of the corresponding images such that the VLCD voltages may be determined in advance. As indicated previously, the present disclosure contemplates the use of additional transfer functions besides gamma functions, optionally with the capability of switching between transfer functions for displays 12 of the type having capabilities for supporting multiple transfer functions.

The terms “comprising”, “including”, and “having” are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term “or” includes any one and all combinations of the associated listed items. The term “any of” is understood to include any possible combination of referenced items, including “any one of” the referenced items. “A”, “an”, “the”, “at least one”, and “one or more” are used interchangeably to indicate that at least one of the items is present. A plurality of such items may be present unless the context clearly indicates otherwise. All numerical values of parameters (e.g., of quantities or conditions), unless otherwise indicated expressly or clearly in view of the context, including the appended claims, are to be understood as being modified in all instances by the term “about” whether or not “about” actually appears before the numerical value. A component that is “configured to” perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A method for dynamically enhancing video images presented through a display in a vehicle, comprising:

measuring, with a forward looking light sensor within the vehicle, a forward looking light entering the vehicle and visible to an occupant to generate a forward looking luminance value;

measuring, with an ambient light sensor within the vehicle, an ambient light within the vehicle and present at the display to generate an ambient luminance value;

determining, with an electronic control unit within the vehicle, external factors influencing symbology of human visibility for the video images to be presented through the display in response to the forward looking luminance value and the ambient luminance value;

receiving imaging properties for the video images at the electronic control unit;

processing the external factors and the imaging properties in the electronic control unit according to an image enhancement process, the image enhancement process creating a plurality of enhanced setpoint voltages that establish a variable gamma transfer function operable for maintaining symbology of the video images against the external factors; and directing the display to present the video images according to the variable gamma transfer function.

2. The method according to claim 1, further comprising:

identifying a plurality of nominal setpoint voltages from a nominal gamma transfer function of the display, the nominal gamma transfer function cross-referencing each of the nominal setpoint voltages relative to display current or display voltages for the display and gray shade values included as at least part of the imaging properties for the video images.

3. The method according to claim 2, further comprising:

specifying the enhanced setpoint voltages within the variable gamma transfer function cross-referencing each of the enhanced setpoint voltages relative to the display current or the display voltages and the gray shade values.

4. The method according to claim 3, further comprising:

generating a setpoint message for use in conveying the variable gamma transfer function to the display, the setpoint message delineating the enhanced setpoint voltages to be used when presenting the video images through the display.

5. The method according to claim 4, further comprising:

generating a display luminance control message for use in conveying display luminance control values to the display, the display luminance control values dynamically varying a luminance of the display as a function of the external factors.

6. The method according to claim 4, further comprising:

delineating the enhanced setpoint voltages within a lookup table configured for cross-referencing each of the enhanced setpoint voltages relative to the display current or the display voltages and the gray shade values.

7. The method according to claim 5, further comprising:

interpolating within the display the display current or the display voltages for the gray shade values beyond the gray shade values specified with the enhanced setpoint voltages.

8. The method according to claim 3, further comprising:

selecting the enhanced setpoint voltages to adjust gamma characteristics for the display relative to the nominal setpoint voltages.

9. The method according to claim 8, further comprising:

selecting the enhanced setpoint voltages based at least in part on a histogram of the video images.

10. The method according to claim 8, further comprising:

the gamma characteristics of the display being defined according to a gamma transfer function represented as:

$$L = L^{\gamma}_{max}\left(\frac{GS_{in}}{GS_{max}}\right)$$

where:

L is an output luminance of the display;

$L_{max}$ is a maximum display luminance of the display;

$GS_{in}$ is an input gray shade value for a given pixel of the display;

$GS_{max}$ is a maximum possible gray shade value for a given pixel; and $\gamma$ is a gamma characteristic of the display.

11. The method according to claim 8, further comprising:

presenting the video images through the display according to the enhanced setpoint voltages.

12. The method according to claim 11, further comprising:

presenting the video images without remapping of the gray shade values for the video images.

13. The method according to claim 1, further comprising:

deriving the external factors in further response to:

a biometric sensor configured for sensing pupillary responses and/or a pupil diameter of the occupant while viewing the display; and a camera configured for recording video images of the vehicle, the display, and/or an ambient environment inside and/or outside of the vehicle.

14. The method according to claim 1, further comprising:

the display configured as a transmissive display.

15. The method according to claim 1, further comprising:

the display configured as an emissive display.

16. A display system for a vehicle, comprising:

a display operable within the vehicle for presenting video images received in an input video signal to an occupant of the vehicle;

a forward looking light sensor operable within the vehicle for generating a forward looking luminance value by measuring a forward looking light entering the vehicle and visible to the occupant;

an ambient light sensor operable within the vehicle for generating an ambient luminance value by measuring an ambient light within the vehicle and present at the display; and an electronic control unit operable within the vehicle for:

determining external factors influencing symbology of human visibility for the video images to be presented through the display in response to the forward looking luminance value and the ambient luminance value;

receiving imaging properties for the video images;

processing the external factors and the imaging properties according to an image enhancement process, the image enhancement process creating a plurality of enhanced setpoint voltages that establish a variable gamma transfer function operable for maintaining symbology of the video images against the external factors; and directing the display to present the video images according to the variable gamma transfer function.

17. The display system according to claim 16, wherein: the electronic control unit is further operable for selecting the enhanced setpoint voltages according to a gamma transfer function or another transfer function, each specifying the enhanced setpoint voltages according to display current or display voltages for the display and gray shade values for the video images.

18. The display system according to claim 16, wherein: the display is configured for presenting the video images according to the enhanced setpoint voltages without remapping of gray shade values specified for the video images within the input video signal.

19. An electronic control unit for dynamically enhancing video images presented through a display of a vehicle, the electronic control unit configured for:

receiving, from a forward looking light sensor within the vehicle, a forward looking light entering the vehicle and visible to an occupant to generate a forward looking luminance value;

receiving, from an ambient light sensor within the vehicle, an ambient light within the vehicle and present at the display to generate an ambient luminance value;

determining external factors influencing symbology of human visibility for the video images to be presented through the display in response to the forward looking luminance value and the ambient luminance value;

receiving image properties for the video images;

generating a plurality of enhanced setpoint voltages that establish a variable gamma transfer function operable for maintaining symbology of the video images against the external factors; and directing the display to present the video images according to the variable gamma transfer function such that the symbology of the video images is maintained against the external factors without the display remapping gray shade values specified for the video images.

20. The electronic control unit according to claim 19, further configured for:

directing the display to present the video images according to luminance control values, the luminance control values dynamically varying a luminance of the display as a function of the ambient luminance value.

* * * * *